(12) United States Patent
Harris

(10) Patent No.: US 6,473,031 B1
(45) Date of Patent: Oct. 29, 2002

(54) POSITION PRIVACY IN AN ELECTRONIC DEVICE

(76) Inventor: Scott C. Harris, P.O. Box 927649, San Diego, CA (US) 92192

( * ) Notice: Subject to any disclaimer, the term of this patent is extended or adjusted under 35 U.S.C. 154(b) by 0 days.

(21) Appl. No.: 09/690,001

(22) Filed: Oct. 16, 2000

(51) Int. Cl.[7] .............................. G01S 5/02; H04B 7/185
(52) U.S. Cl. .............................. 342/357.09; 342/357.1; 701/215; 455/456
(58) Field of Search .................. 342/357.09, 357.1; 701/215; 455/456

(56) References Cited

U.S. PATENT DOCUMENTS

| | | | | |
|---|---|---|---|---|
| 5,222,245 A | | 6/1993 | Ando et al. | |
| 5,301,368 A | * | 4/1994 | Hirata | 455/78 |
| 5,731,785 A | | 3/1998 | Lemelson et al. | |
| 5,751,373 A | * | 5/1998 | Ohyama et al. | 348/569 |
| 5,940,753 A | | 8/1999 | Mallinckrodt | |
| 6,049,718 A | * | 4/2000 | Stewart | 455/456 |
| 6,069,570 A | * | 5/2000 | Herring | 340/825.49 |
| 6,085,090 A | * | 7/2000 | Yee et al. | 455/440 |
| 6,107,960 A | * | 8/2000 | Krasner | 342/357.09 |
| 6,222,484 B1 | * | 4/2001 | Seiple et al. | 342/357.09 |

* cited by examiner

Primary Examiner—Theodore M. Blum

(57) ABSTRACT

A privacy enhancement device for electronic device such as a cellular telephone. In one mode, the cellular telephone operates in its normal mode, whereby its position can be detected by either wap techniques or by GPS techniques. In a second mode of operation, the wap/GPS operation is overridden, so that the position cannot be detected.

12 Claims, 2 Drawing Sheets

POSITION PRIVACY IN AN ELECTRONIC DEVICE

BACKGROUND

The present invention defines a system for enhancing a privacy in enhancement in an electronic device with automatic position location detection.

Modern electronic devices often include automatic position location detection technology. For example, the modern cellular phone may include a satellite positioning system such as a GPS device. Other cellular phones, referred to as a WAP phones, also automatically keep track of the users position.

FIG. 1 shows an electronic device, which can be a wap phone, regular cellular phone, or any other electronic device 100. The device is shown with electronic circuitry including electronic processor 110 which processes signals from both GPS device 115, and from a codec 120. The processor also controls an RF device 125.

The electronic device automatically determines its position. In this embodiment, it does so by communicating with a constellation of global position detecting satellites 130, for automatic determination of position. The electronic device may also communicate with the server 140, such as to a base station. The electronic device may communicate its determined position to the server. This may be done, for example, for emergency purposes. In the case of a WAP device, this may be done simply to monitor the position of the cellular phone. The server may output the position, shown as 150.

SUMMARY

The present application defines a device which enhances privacy in such a system. Specifically, the present application teaches a device which selectively prevents the electronic device from transmitting its position. This hence allows selection of an enhanced privacy mode.

BRIEF DESCRIPTION OF THE DRAWINGS

These and other aspects of the invention will be described in detail with reference to the accompanying drawings, wherein.

DETAILED DESCRIPTION

Figure 1:
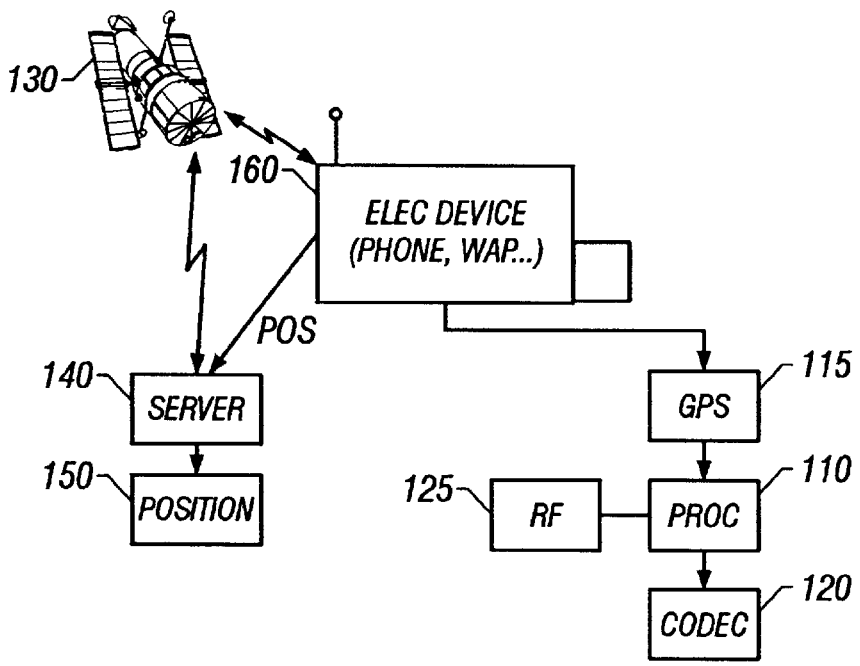
FIG. 1 shows are block diagram of an electronic device with a built-in automatic position location detection system.
Figure 2:
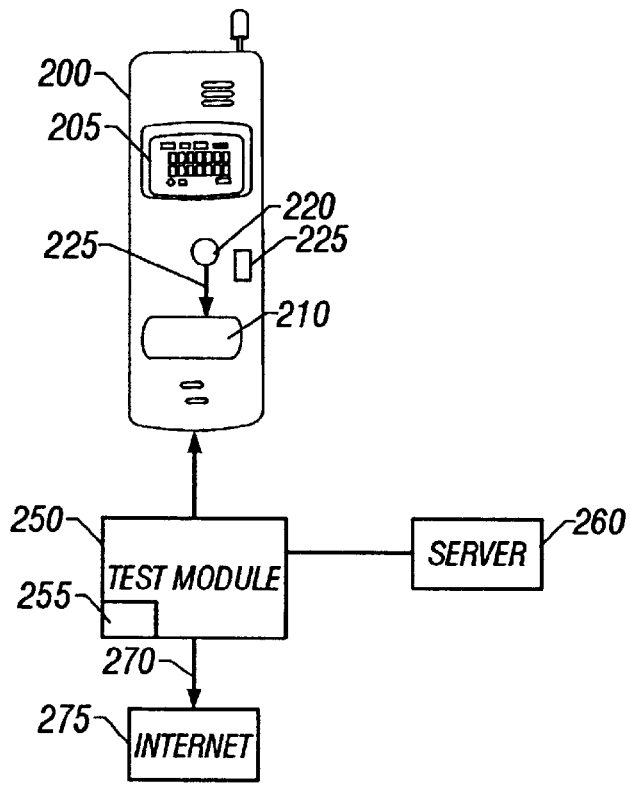
FIG. 2 shows a first embodiment of a privacy enhancing device for an electronic element.

The first embodiment is shown in FIG. 2. In this embodiment, the electronic device is a portable telephone such as a cellular phone. However, it should be understood that other electronic devices, such as computers, personal digital assistants, or any other device which is capable of communicating in any way, may use similar techniques to those disclosed herein.

A portable phone 200 has a normal user interface 205, and other structure such as display, etc. The device also includes a positioning device 210. In this embodiment, a position detection block control 220 is provided. This is an actuation mechanism, such as a button which can be pressed to deactivate the function of the positioning device 210. The unit's normal position forms an enable signal 225 which enables the position detector 210, allowing the position detector to determine its position, and report that position to a remote source, such as a base station. When the button is in its override position, an indicator 225 is illuminated, indicating the privacy mode has been entered. In this privacy-enhanced state, the enable signal is removed, thereby preventing position detector 210 from reporting its position.

A concern, however, is that some users, either hackers or others with more aura of authority, may use this system in a way which determines position surreptitiously, e.g., even when the button is placed on override. For example, law-enforcement officials might use this system to keep track of someone without their knowledge. One way to do this might be to fake an emergency call or the like. Doing this, however, may have serious privacy implications.

If a manufacturer includes a "back door" into the system, that "back door" might be used to determine the position of a person, without their authority or knowledge.

A test module 250 can be used to test the degree of privacy associated with the electronic device. This test module is connectable to the server 260. It also runs a software layer 255 which can be updated via channel 270, e.g., over the Internet. The test module 250, in operation, communicates with a service over the internet. The service employs experts to research and store the latest and most up-to-date way of improperly obtaining position in such a system. This is available via update 270 from the Internet. This may be carried out as a subscription service, in a similar way to the operations currently done to update virus definitions. The Internet returns ways of hacking the position detection prevention, which can hence be used by the test module to evaluate the privacy provided by the actuation 220.

The test module sends a request for position location to the phone 200, using the best available techniques. The phone returns information, and this information is evaluated by the server 260. Server 260 returns an evaluation of the operation to the test module 250. This can provide a user with an indication of the level of privacy they have obtained.

Figure 3A:
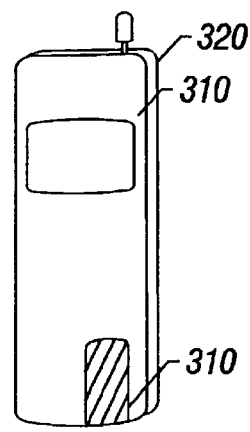
FIGS. 3A and 3B show a passive version of the privacy enhancing device using an RF blocking technique.
Figure 3B:
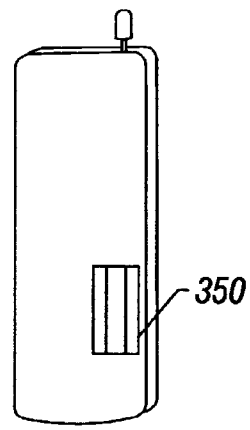

Another embodiment is shown in FIGS. 3A and 3B. This embodiment may be most usable with a satellite positioning system in a telephone. In this kind of phone, both sets of electronics—the GPS and the codec—may use a common processor. However, a GPS system often requires a separate antenna shown as 300. The separate antenna may be very sensitive to reception. For example, while cellular telephones can often be used indoors, corresponding GPS devices may not be usable in the same situations. Moreover, each separate telephone type will have a GPS antenna 300 placed in a specified location. There are relatively few telephone types in common use, usually less than 50 types. This system finds, for each telephone type, where the GPS antenna will be placed. The device 350 is made of an RF absorbing or reflecting material such as metal. The device is also made in way which allows it to be temporarily attached to the telephone, e.g., by clipping on to the phone. For example, the device may fit on both sides of the telephone 310 and 320 and wrap around the telephone to cover areas adjacent the antenna on both of the surfaces. The cover 350 covers both sides of the antenna 300, and therefore prevents GPS operation while the cover is clamped into place. In this way, privacy can be effectively temporarily enhanced. FIGS. 3A and 3B show two different places where the shield could be attached; but it should be understood that the shield could be attached in many different places.

One of the stated uses of GPS in a portable phone is for use in an emergency. When the user dials 911, the GPS device allows the emergency authorities to determine the user's precise location. In order to allow this, the cover can be maintained in place during all operations other than emergencies. During emergencies, the cover can be removed. But once the cover is removed, the position of the electronic device can be automatically detected, as usual.

Figure 4:
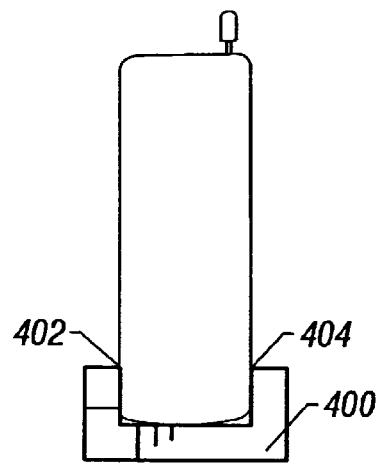
FIG. 4 shows an active jammer device which actively produces a signal to prevent the reporting of position.

The system of FIGS. 3A and 3B may not work with certain phones. An alternative system is shown in FIG. 4. In this phone, an active jammer module 400 is provided. The jammer module either supplants or fools the system into obtaining false position information. For example, the jammer module may provide false satellite information, e.g., indicating a false satellite position.

Satellite positioning system information is often provided in broad spectrum noise. The jammer 400 may produce broad spectrum noise, which includes information indicative of three satellites, but which is transmitted at a sufficiently low power to be receivable only at a very short range. In the system of FIG. 4, the jammer can also be attached using attachment clips 404. The attachment can place the transmitter of the jammer in close proximity with the satellite positioning system antenna.

The jammer information can produce outputs that indicate a false location, for example. Similar operations can be carried out with WAP phones. In a WAP phone, for example, the system may override the carrier, or tell the carrier false information about where the phone is located. This may include providing false triangulation information into the system or the like.

Other modifications are possible and are within the disclosed invention.

What is claimed is:

1. An apparatus, comprising:
   an electronic device having a position detection module therein which determines a position of said electronic device and reports information indicative of said position of said electronic device to a remote object; and
   an override control, which is actuated to prevent said position detection module from reporting said information about its position, but which allows other parts of said electronic device to operate.
   wherein said override control includes a passive blocking element which is attached to a portion of said electronic device to block reception of information by said position detection module.

2. An apparatus as in claim 1, wherein said position detection module is a satellite positioning system module, and said passive blocking element is an element which blocks an antenna associated with said satellite positioning module from receiving said information.

3. An apparatus, comprising:
   an electronic device having a position detection module therein which determines a position of said electronic device and reports information indicative of said position of said electronic device to a remote object;
   an override control, which includes an actuating mechanism and which, in response to actuating of said actuating mechanism produces a signal state that prevents said position detection module from reporting said information about its position until a deactuation of said actuating mechanism, but which allows other parts of said electronic device to operate; and
   wherein said override control includes a jamming element which produces information that interferes with operation of said position detection module responsive to said actuating, and stops producing said information responsive to said deactuation.

4. An apparatus as in claim 3, wherein said information includes false information that provides false data to said position detection module.

5. An apparatus as in claim 3 wherein said jamming element is connected to receive electrical power from said electronic device.

6. An apparatus, comprising:
   an electronic device having a position detection module therein which determines a position of said electronic device and reports information indicative of said position of said electronic device to a remote object;
   an override control, which is actuated to prevent said position detection module from reporting said information about its position, but which allows other parts of said electronic device to operate; and
   a privacy detection element, which tests whether said position detection module will report unauthorized information when requested;
   wherein said privacy detection element includes an update function which updates said privacy detection element to allow it to use different techniques to determine said report of unauthorized information.

7. A method of operating an electronic device, comprising:
   allowing, in a first mode of operation, automatic reporting of a position of said electronic device;
   allowing a second mode of operation which prevents said automatic reporting of said position of said electronic device; and
   wherein said second mode of operation comprises attaching a passive reception blocking device to said electronic device.

8. A method of operating an electronic device, comprising:
   enabling a first mode of operation in which automatic reporting of a position of said electronic device is allowed; and
   responsive to a manual actuation of an actuating mechanism, disabling said automatic reporting of said position of said electronic device and thereby preventing reporting of said position, wherein said second mode of operation comprises actively jamming a position detection operation.

9. A method comprising:
   operating a cellular phone in a first mode in which its position can be automatically reported to a remote location;
   responsive to an action by a user of a specific type, operating said cellular phone in a second, privacy enhanced mode, in which cellular phone functions can be used to place and/or receive calls, but its position can not be automatically reported to said remote location;
   testing said cellular phone while operating in said second, privacy enhanced mode, to determine whether privacy is actually enhanced; and
   updating a way that said cellular phone carries out said testing.

10. An apparatus, comprising:
    a portable telephone, including:
    (1) telephone electronics enabling telephone communication;

(2) a position detection module therein which enables determining a position of said portable telephone as a determined position; and (3) a reporting device which reports information indicative of said determined position of said portable telephone to a remote object; and a manually operable override control, associated with said portable telephone, operating in response to a manual operation, to prevent said reporting device from reporting any information indicative of the determined position, but allowing said telephone electronics to continue to operate; and wherein said override control includes a jamming element which produces a jamming signal, responsive to said override control, that prevents said reporting device from reporting said information indicative of said determined position.

11. A method of operating a cellular telephone, comprising:

allowing, in a first mode of operation, automatic reporting of a position of said cellular telephone, and allowing communication between said cellular telephone and a cellular telephone base station;

responsive to a manual actuation, allowing a second mode of operation which prevents any automatic reporting of said position of said cellular telephone, but which still allows communications between said cellular telephone and said cellular telephone base station;

wherein said automatic reporting in said first mode of operation comprises automatic detection of a position of said electronic device via satellite positioning;

wherein said second mode of operation prevents said position module from detecting the position via satellite positioning; and wherein said second mode of operation interferes with operation of satellite positioning circuitry via jamming.

12. A method, comprising:

operating a cellular phone in a first mode in which its position can be automatically reported to a remote location; and responsive to an action by a user of a specific type, operating said cellular phone in a second, privacy enhanced mode, in which cellular phone functions can be used to place and/or receive calls, but its position can not be automatically reported to said remote location; and wherein said action by said user comprises attaching an external blocking device to said cellular phone.

* * * * *